INVENTOR
O. H. WILLIFORD
BY Howard R Popper
ATTORNEY

AUTOMATIC CALL RECORDING SYSTEM

Filed Dec. 16, 1960

3 Sheets-Sheet 2

INVENTOR
O. H. WILLIFORD
BY Howard R Popper
ATTORNEY

INVENTOR
O. H. WILLIFORD
BY Howard R Popper
ATTORNEY

United States Patent Office 3,062,918

Patented Nov. 6, 1962

3,062,918
AUTOMATIC CALL RECORDING SYSTEM

Oscar H. Williford, Bronxville, N.Y., assignor to Bell Telephone Laboratories, Incorporated, New York, N.Y., a corporation of New York Filed Dec. 16, 1960, Ser. No. 76,352
21 Claims. (Cl. 179—7)

This invention relates to automatic telephone switching systems and more particularly to a system for automatically assessing charges on calls originated from extension stations of private branch exchanges against the particular station making the call.

The advent of direct distance dialing has in recent years increased both the flexibility and efficiency of telephonic communications to the extent that at present, or in the very near future, direct distance dialing will be widely accepted as an adjunct of standard telephone service. The wider application of this feature, by means of which a subscriber may dial any other subscriber in the United States without the assistance of an operator, has heretofore reached an impasse in the case of calls placed from private branch exchange extension stations. The customers subscribing for private branch exchange service are reluctant to permit direct distance dialing from their extension stations because of the obvious danger of unauthorized persons placing unauthorized toll calls. Accordingly, such private branch exchange subscribers have heretofore continued to require the presence of switchboard operators on their premises for the purpose of intercepting toll calls until the identity of the calling extension station is determined. It is, therefore, an object of the present invention automatically to identify by directory number the identity of calling stations at private branch exchanges.

It is another object of the present invention to provide for the automatic assessment of telephone call charges against individual extension stations placing chargeable calls.

It is another object of the present invention to provide such extension identification equipment which is compatible with existing private branch exchange and central office switching equipments.

The foregoing and other objects are attained in one illustrative embodiment according to the principles of the present invention wherein a plurality of private branch exchanges each having numerous extension stations is associated with a central office by means of the usual trunk lines, each private branch exchange having, however, in addition thereto, a separate signaling channel to the central office. All calls originated from extension stations are carried through to an available one of the outgoing trunk lines connecting the private branch exchange to the associated central office. The calls are processed by the central office switching equipment in the usual manner to determine the class of service of the calling line, whether a ring or tip party station is calling and to select an appropriate outgoing route. For a predetermined combination of class of service and outgoing route the marker reverses the station party identification furnished it by the line equipment and passes on the reversed identity to the transverter. The transverter seizes a translator which converts the equipment location designation of the calling line to a four-digit destination, two digits of which provide access to the special signalling channel and two digits of which designate the number at the PBX of the trunk over which the call was routed to the central office. The trunk number is transmitted over the selected signaling channel to a trunk selector at the PBX which selector applies an identifying potential to the sleeve terminal of the trunk over which the call was placed to the central office. The identifying potential finds its way back through the PBX switching train to the connector bank sleeve terminals of the calling extension station line. At the connector bank the sleeve terminals of each extension station line are connected to the winding of a respective identifier relay which is operated by the identifying potential. The contacts of each of the identifying relays energize distinctive conductors in a four-decade number bus according to the particular four-digit directory number designation assigned to the PBX extension stations. The four energized conductors of the number bus operate a common identifier to control an outpulsing sender which transmits the four-digit directory number designation of the calling extension station to the central office over the separate signaling channel. At the central office the calling extension station directory number is entered on the usual message accounting tape in place of the directory number of the PBX subscriber. In the event that the extension station directory number is not obtained within a predeterminable time or in the event that the call causes a local switching route to be selected for which detailed billing is not required, the ring party indication is refurnished to the transverter which thereupon seizes a conventional AMA translator to provide the basic directory number of the PBX subscriber.

According to one aspect of the present invention, the tens and units digits of PBX extension stations are indicated by connections extending from contacts of connector bank sleeve terminal relays to appropriate conductors in a decimal number bus. A contact of the extension identifying relays of each connector bank extends an operating path to the winding of a connector bank common relay whose contacts extend connections for the appropriate thousands and hundreds digits conductors of the number bus.

According to another aspect of the present invention the central office marker for a particular combination of calling line service class and called office switching route temporarily reverses the party designation of the calling station which it would normally furnish to the transverter for a call from the same line equipment location and causes the transverter to seize a translator providing access to the extension identifying apparatus at the PBX.

A feature of this invention is, therefore, an extension station number identifier at the PBX which is called into operation by an equipment number translator at the central office in response to the origination of a chargeable call by the extension station.

Another feature of the present invention is means for obtaining an indication of the PBX subscriber's basic directory number when, for any reason, the directory number of a calling extension at the PBX cannot be obtained.

A still further feature of the present invention is means for translating the central office equipment location of any set of PBX trunk line terminals into a coded designation by means of which the sleeve terminal of the same trunk may be seized at the PBX for the application thereto of an extension identifying potential.

It is another feature of the present invention that the selection of a central office PBX signaling channel supplement the extension station directory number identifying signals provided by the PBX with an office code designation without requiring that designation to be transmitted over the signaling channel.

The foregoing and other objects and features may become more apparent by referring now to the drawing:

FIG. 1 of which shows in schematic form a group of private branch exchanges having the extension station identifying apparatus illustrative of the principles of the present invention;

FIGS. 2 and 3 of which show a central office having the translators and signaling means which cooperate with the apparatus of FIG. 1; and FIG. 4 shows how FIGS. 1–3 should be oriented.

In FIG. 1 a group of 100 PBX's has been illustrated by showing in detail the structure internal to PBX 00 and by merely indicating the existence of the other PBX's each of which may be individually connected with the central office of FIGS. 2 and 3 by means of one-hundred trunk circuits numbered from 00 to 99. In addition to the trunk circuits, each PBX is individually connected to the central office by means of separate signalling channel 17, which signaling channel will be hereinafter more fully described.

In accordance with any well-known method of telephone switching circuit operations, e.g., step-by-step switching, any of PBX 00's extension stations (not shown) may operate a line finder LF and selector SEL to reach an idle one of the trunk circuits T00 through T99 by means of which a switching connection is established to the central office. Again, for purposes of simplicity only the first and last of the trunk circuits T00 and T99 and only the sleeve terminal connections therein will be shown. In addition, it is to be understood that at the central office (FIG. 2) the T and R line conductors of the trunk circuits terminate at individual equipment terminals (not shown) of a respective line link frame LLF; the particular location of the equipment terminals being defined by specifying the number of the line link frame and the vertical group, having a group and vertical file of line switches with which the particular terminals are associated.

The detailed description of the conventional operation of the incoming line link frame LLF, trunk line frame TLF, as well as the manner in which the marker controls the connection of the originating register, outgoing sender, the conventional AMA recording equipment and the outgoing trunk circuit OTC is shown in A. J. Busch Patent 2,585,904, February 19, 1952, and Matlack et al. Patent 2,733,297 of January 31, 1956. Briefly, however, the originating register connected to trunk link frame TLF receives and stores the digits dialed by the calling extension and under the control of the marker transfers these digits to the marker. The marker decodes the digits of the called office code, selects an appropriate outgoing trunk route and controls the establishment of a channel CH between the trunk link frame TLF and the outgoing trunk OTC. The marker transfers to the outgoing sender, SR the information needed for completing the call and for making the automatic message accounting record. In doing so the marker obtains from the originating register the line link frame LLF location and the service class of the calling line. The marker also controls the originating register to determine whether the call is being made by a tip party or by a ring party station and trasnlates the called office code to determine whether a "short haul" or "long haul" call is involved, i.e., whether it will be necessary for the AMA equipment to record merely the directory number of the calling subscriber and the duration of the call, or whether it will be necessary to record the directory number of the called subscriber as well as certain additional information.

Since either type of call necessitates that the directory number of the calling subscriber must be optained for billing purposes, the transverter is normally operated to seize a translator 7 and enter therein the line terminal equipment location designation of the calling line; see for example Cahill-Carpenter-Diamond Patent 2,599,358, June 3, 1952. Translator 7, as therein described, converts the equipment location designation into the directory number code of the calling subscriber and this directory number is transmitted (over cable 7–3) back to the transverter for entry by the transverter into the AMA register equipment, which equipment provides for the assessing of charges against the calling subscriber.

While not explicitly shown in the drawing, the central office normally may serve, in addition to lines from PBX subscribers, individual subscribers' lines having one, two or more party stations. These subscribers' stations are, in accordance with standard telephone practice, connected to the telephone line to reflect a particular signaling condition at the central office line link frame terminals. The line link frame terminals of private lines, PBX lines, and two-party lines when handling a call from the ring party station exhibit a "station-not-grounded" or "ring party" indication. On the other hand, an "off-hook" telephone at the tip party station gives a "station-grounded" indication. Accordingly, when the marker, as explained above, controls the transverter in response to a call from a PBX line, the transverter is given a "ring party" indication and seizes, by means of its ring party cross-connection terminals RXC–, a ring party translator such as the aforementioned translator 7.

On the other hand, calls originated from the tip party station of two-party lines cause the transverter to be connected to a tip party translator (not shown) which tip party translator is connected to a tip party cross-connection TXC– in the transverter.

In accordance with the present invention, private branch exchange subscribers who do not desire to have individual identification made of their various extensions will continue to be designated as ring party stations and will continue to be identified according to their basic PBX directory number. On the other hand, incoming trunk lines of private branch subscribers desiring individual identification of extension stations directory numbers, although still appearing to the line and trunk link frames as ring party lines, will be designated to the transverter by the marker as if they were tip party station lines and the transverter will select a tip party cross-connection TXC– and a special translator 8, as will be hereinafter more fully described.

*Detailed Description of Central Office*

Figure 1:
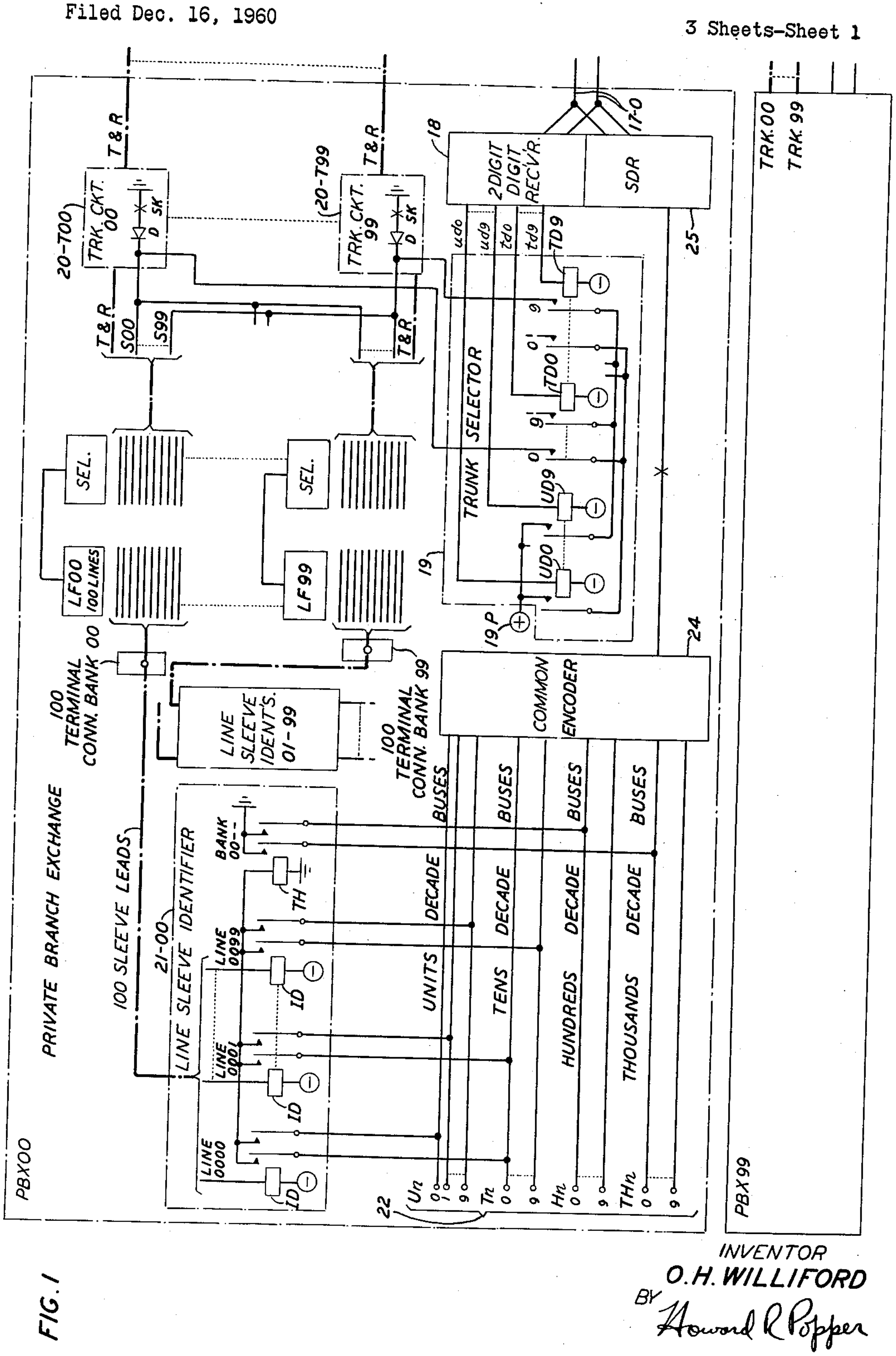

The line link frame LLF typically includes a plurality of crossbar switches which are normally arranged so that up to 30 possible classes of service may be assigned to the lines terminating thereon, the same class of service being applicable to all of the lines in a given vertical file of ten line equipments. A group of five adjacent vertical files is called a vertical group and two adjacent vertical groups are known as a vertical column. A line terminal location on the line link frame is completely specified by determining the vertical and horizontal groups and the vertical file in which the line terminal exists. In the normal operation of the crossbar switch system described in the above-mentioned A. J. Busch Patent 2,585,904 the location of a calling line on a line link frame is determined by the originating register and entered in the marker. The originating register is also given the class of service of the calling line and determines whether a tip party or ring party station is associated with the calling line whereupon the foregoing information is entered in the marker. The vertical and horizontal group, vertical file and frame tens and units relays on the originating register, marker and sender are omitted from the drawing, the information stored by these relays being conveyed over the cables *vg* and *hg*, *vf* and *f*(TN,U) to the indicated relays of the transverter bearing upper case designations.

PBX trunk lines, like other incoming subscribers' lines, are connected to equipment terminals at the line link frames that are in vertical files assigned to one or another of the thirty possible classes of service. A calling condition detected at any of the line terminals in a given vertical file will, therefore, cause the same one of a plurality of class of service relays in the originating register and in the marker to be operated. Lines from PBX subscribers desiring extension station directory number identification on outward charge detailed billed calls in accordance with the present invention may advantageously be assigned to the terminals of line link frame vertical files which do not have any two-party lines. A calling condition detected at any of the line terminals in such vertical files will accordingly, cause the originating register to operate class of service relay CID in the marker. However, before describing the special apparatus involved in a detailed billed extension number identified call the circuit operations for a call not requiring extension number identification will first be described.

A call not requiring extension identification may be originated either from a PBX not desiring extension identification as well as from a PBX which desires extension identification only for certain "long hauls." In either event, the originating register will operate relay RP and will transfer to the route translator the digit of the called office code. The marker route translator selects an appropriate route relay (not shown) whose contacts provide an operating path to the winding of relay SH which operates. If the call is from a PBX designated for extension identification class of service relay CID will also be operated by the originating register as determined by the particular vertical file of the line link frame in which the line terminals for the calling PBX are located. Operation of relay RP and auxiliary relay SH extends an operating ground to the winding of relay RPP which operates to provide at its make contact an operating ground to lead *rp*. The back contacts of relay CID in the operating path of relay RPP are bridged by the make contact of relay SH so that short haul calls, whether originated from either class of PBX, will cause relay RPP to provide an operating ground to relay RP. Long haul calls originated from PBX's not desiring extension station identification will of course cause relay RPP to be operated over the back contacts of relay CID. Application of an operating ground to lead *rp* causes relay RP' in the transverter to operate.

In addition to the extension of party identification information to the transverter the marker also passes the tens and units digits of the calling line link frame (only one of which frames LLF is explicitly shown) as well as the vertical and horizontal group and the vertical file numbers of the calling line terminal equipment. The operated ones of the F(U) and F(TN) relays extend an operating ground provided by the make contact of relay RP' to one of the relay windings RF*o*—RF*n*. The vertical group number is furnished the transverter in the form of an operating ground applied to one of the relays VG—VG*n* causing it to operate. Operation of a vertical group relay at its make contact extends an operating ground (via relays CL) to a corresponding make contact on each of the RF– relays. Since the translators hereafter to be described are capable of decoding the line terminal equipment designations of one-hundred line terminals the vertical group information appertaining to fifty line terminals is conveniently consolidated into vertical column information appertaining to one-hundred line terminals. This is advantageously accomplished by pairing contacts of the VG*o*—VG*n* relays to the windings of the CL*o*—CL*n* relays as described in the above-mentioned Cahill et al. Patent 2,599,358. Each contact of the multicontact RPF– relay is connected with a respective cross-connection terminal RXC– to which an operating ground will be extended in response to the operation of a particular pattern of F(U), F(TN), VG and CL relays.

Assuming that the aforementioned "short haul" call is originated over a PBX trunk line whose terminals are in the "zeroth" vertical group of the "zeroth" line link frame, relay tree R and relays VG*o* and CL*o* will extend an operating ground to terminal RXCO over the uppermost contact of relay RF*o*. Jumper JR1 cross-connects terminal RXC*o* to terminal RPX which is associated with the winding of relay A. Extension of the operating ground to start relay A causes it to operate and to extend over its make contact an operating ground to translator connector 7A. Operation of translator connector 7A extends an operating path over its make contact from the horizontal group and vertical file leads *hg* and *vf*, respectively, of the transverter to the decoder 7–1.

Decoder 7–1 is a relay tree which when supplied with horizontal group and vertical file information in the form of operating grounds from the *hg* and *vf* leads in the transverter selects one of a number of jumpers 7J1 through 7JN which threads the translation array 7–2. The particular pattern in which the selected one of the jumpers 7J1 through 7JN threads the translation array 7–2 determines which of the plurality of output leads in cable 7–3 will be provided with an operating ground as described in Matlack et al. Patent 2,733,297 of January 31, 1956. The various levels of translation array 7–2 are arranged to provide a digit descriptive of the calling subscriber's office code as well as the TH, H, T, and U digits of the calling subscriber's directory number. Cable 7–3 conveys via appropriate contacts of connector 7A the directory number information obtained from translation array 7–2 to the AMA directory number register 9 for a subsequent delivery to the AMA recording equipment.

On the other hand, if a call had been originated from the tip party station of a two-party line the originating register would have operated marker relay TP to provide an operating ground to lead *tp* and operate transverter relay TP' associated with the relay tree T. Similarly, the operation of a particular combination of VG, CL, FU, and FTN relays would cause an operating ground to be extended to one of the TXC– cross-connection terminals associated with the contacts of the TF– relays. Thus, a call originated by a tip party subscriber whose line terminates in the *nth* vertical group of the zeroth line link frame would cause an operating ground to be extended to the TXCM cross-connection associated with the lowermost contacts of relay TF*o*. Translation start relay B is cross-connected via jumper JR2 to terminal TXCM. Operation of relay B calls into operation a translation connector and translator (not shown) in similar fashion by that described above for relay A.

The above described operations incident to the handling of a short haul call from a PBX subscriber or a long haul call from single or two-party lines have accordingly resulted in the registration by the AMA recording equipment of the directory number assigned to the PBX subscriber.

While the registration of the PBX directory number is satisfactory and sufficient for many purposes, it is extremely desirable on long haul toll calls originating from a PBX to determine and to register the directory number of the particular PBX extension rather than merely the directory number of the PBX subscriber. For example, the assessment of toll call charges against the directory number of the PBX extension station from which the call is placed is considered by many PBX customers to be a practical prerequisite to their acceptance of direct distance dialing service. In order to effect such identification, the marker is instructed to provide an alternate operating path for relay TP in response to the originating of a "long haul" call by a PBX subscribing for class of service CID. While the originating register continues to inform the marker (by means of an operating ground extended to relay RP) that a call is being made from a "ring party," the translation of the called office code by the marker route translator causes auxiliary route relay LH to be operated whereby contacts LH and CID extend the operating ground to the winding 2 of relay TP. As was mentioned above, relay CID is operated by the originating register having registered the origination of a call in an LLF vertical file to which all lines having the "CID" class of service are assigned.

Operation of relay TP extends an operating ground over lead *tp* to the transverter relay TP' over back contact A. Relay TP' operates and provides ground to the contacts of relay tree T which when operated by energized F(U) and F(TN) relays extends this ground to operate a respective one of the TF– relays one of whose contacts is impressed with an operating ground in accordance with the operation of the VG and CL relays. For example, assuming that the above-described PBX trunk connected to terminals in the zeroth vertical group of the zeroth line link frame is handling a "long haul" call, an operating ground will be extended to terminal TXC*o* associated with the uppermost contacts of relay TF*o*.

Terminal TXC*o* is cross-connected to translator start relay C by means of jumper JR3 and relay C operates to extend an operating ground to translator connector 8 through whose contacts the horizontal group *hg* and vertical file *vf*, information buses are connected to the decoder access circuit 8–1 of translator 8. Decoder access circuit 8–1 selects a corresponding one of the jumpers SJ1 through SJ*n* which thread translation array 8–2 in similar fashion to translator 7. The jumpers SJ1 through SJ*n* thread the four levels of translator array 8–2 in distinctive patterns in accordance with which translator 8–2 energizes the leads of cable 8–3 to indicate two pairs of digits similar to the TH, H, T, and U digits indicated by translator array 7–2. The TH and H pair of digits designate the number of the calling PBX in the central office. The second pair of digits provided by array 8–2 through cable 8–3 indicates the tens and units digits of the calling trunk number connecting the PBX to the central office.

The TH and H digits indicated by the application of an operating ground to leads in subcable 8–3*a* of cable 8–3 are entered in signaling channel access circuit 10 to operate windings of relays individually associated with each of the leads in cable 8–3*a*. The tens and units digits of the calling trunk number are entered in trunk number register 12 by means of the application of an operating ground to the corresponding leads of subcable 8–3*b* of cable 8–3. Simultaneously with the entry of the trunk number in register 12, lead 12*a* is energized activating terminal *s* of timber 20 thereby causing timer 20 to start its timing cycle. Entry of the TH and H digits in access circuit 10 causes one of the hundred PBX connector start cables PSC00 to PSC99 to be activated with an operating ground thereby causing the associated RPC relay to operate. Operation of relay RPC extends an operating path from the sender 14*a* to the special signaling channel 17 associated with the calling PBX. The trunk number (T and U) digits in sender 14*a* which transmits the digits over the signal channel 17–0 energizes appropriate ones of the *td*– and *ud*– leads to operate a respective UD– and TD– relay of trunk selector 19. The operation of a pair of the TD– and UD– relays in trunk selector 19 extends battery 19P potential to the sleeve terminal of the calling trunk circuit 20–T (i.e., that trunk circuit whose digit designation was obtained by the T and U output levels of translator 8). Application of battery 19P potential back-biases trunk circuit diode D removing the holding ground provided by the sleeve conductor at the contacts SK of the operated trunk holding relay (not shown). However, the established switching train LF–SEL connection is not released by the removal of the holding ground in that battery 19P potential continues to maintain the above-mentioned trunk holding relay winding energized. Application of battery 19P potential to the calling trunk circuit 20–T—sleeve terminal S— results in the battery potential 19P being applied back through the sleeve connections of the switching train SEL through LF to the connector bank sleeve terminal of the calling PBX extension. Associated with each of the hundred sleeve terminals of a connector bank is a line sleeve identifier 21 having a respective identifying relay ID which relay when energized by the potential 19P extends an operating ground provided at the winding of relay TH to a respective one of the tens decade T*n* and units decade U*n* leads 22. In this manner the identifying relay for each connector bank sleeve terminal will activate a distinctive combination of decade buses to represent its assigned directory number.

While the identifying relays ID of FIG. 1 are shown having contacts for applying grounds to different ones of the decimal buses 22 in accordance with the telephone directory numbers corresponding to each of the line sleeve terminals at the connector bank, because connector bank terminals are conventionally wired so that the coordinate position occupied by each terminal corresponds in a systematic fashion to a telephone line directory number, the contacts of the identifying relays may advantageously be wired to activate row and column buses (not shown) corresponding to the coordinates of a calling line. When this coordinate bus arrangement is adopted the number of identifying relays advantageously may be reduced to those in the single 10 x 10 array required for one connector bank of one-hundred line sleeve terminals. Common encoder 24 in response to the activation of one of the T*n*, U*n*, H*n* decade buses encodes and registers the four-digit extension station directory number in sender 25. Sender 25 outpulses the digits of the calling extension stations directory number over signaling channel 17– and the contacts of the associated PBX connector 16– to receiver 14*b* at the central office.

The office digit portion of the calling extension station directory number advantageously may be obtained from the signaling channel connector relay RPC and cross-connection field 27 thereby obviating the need to utilize signaling channel time for this purpose. The office digit may with equally advantageous results be obtained by utilizing one of the levels of translator 8 in similar manner to that in which translator 7 provided the office digit portion of the basic PBX directory number. Entry of the digits of the extension station number in receiver 14*b* activates terminal *h* of timer 26 causing timer 26 to be reset thereby preventing energization of terminal *t*. The digits registered in receiver 14 and the digits from field 27 are applied via cable 8–3*a* to the directory number register 9 of the transverter for entry in the AMA recording equipment.

*Alternate Treatment of Chargeable Calls*

If for some reason receiver 14*b* fails to obtain the four-digit designation of the calling extension stations directory number, timer 2*b* would time out providing an operating ground at its terminal *t* which operating ground will be extended over an appropriate contact of translator connector 8A to transverter relay A′. Operation of transverter relay A′ at its back contact opens the operating path for relay TP′ and relay C causing these relays to release and at its make contact relay A′ provides an alternate operating ground for relay RP′. Operation of relay RP′ extends over the contacts of the operated F(U) and F(TN) relays of the relay tree R an operating ground to the corresponding one of the RF– relays, the operated one of which extends an operating ground from the VG and CL relays to an RXC– cross-connection terminal. An appropriate relay A cross-connected to the RXC– terminal is operated extending an operating ground to translator connector 7A and translator 7 functions to provide the basic directory number of the calling PBX subscriber in the same manner as was described above for a short haul call originating from the same PBX.

Thus it is seen that a PBX whose trunk line terminals at the line link frame are designated for class of service CID will have the directory number of its calling extension station recorded in the AMA directory number register 9 whenever a long haul call is made so that the PBX subscriber may be apprised of the extension from which toll calls are originated. On the other hand a short haul call originating from any of the extension stations of the PBX will cause the basic PBX directory number to be recorded in register 9. Since the more expensive toll calls are directly correlated with the calling extension station, it is anticipated that PBX customers will more readily subscribe to the direct distance dialing type of service.

Figure 2:
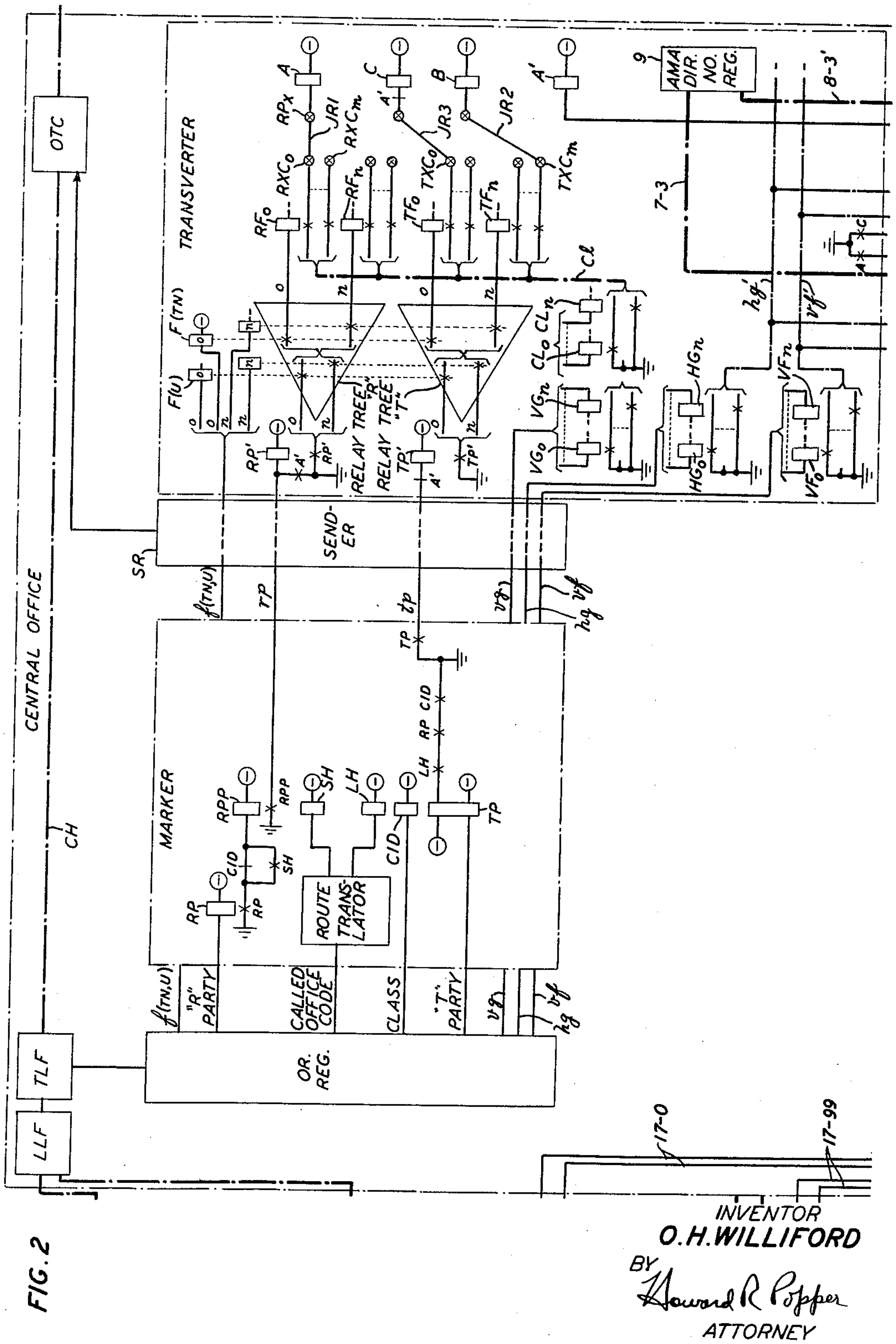
Figure 3:
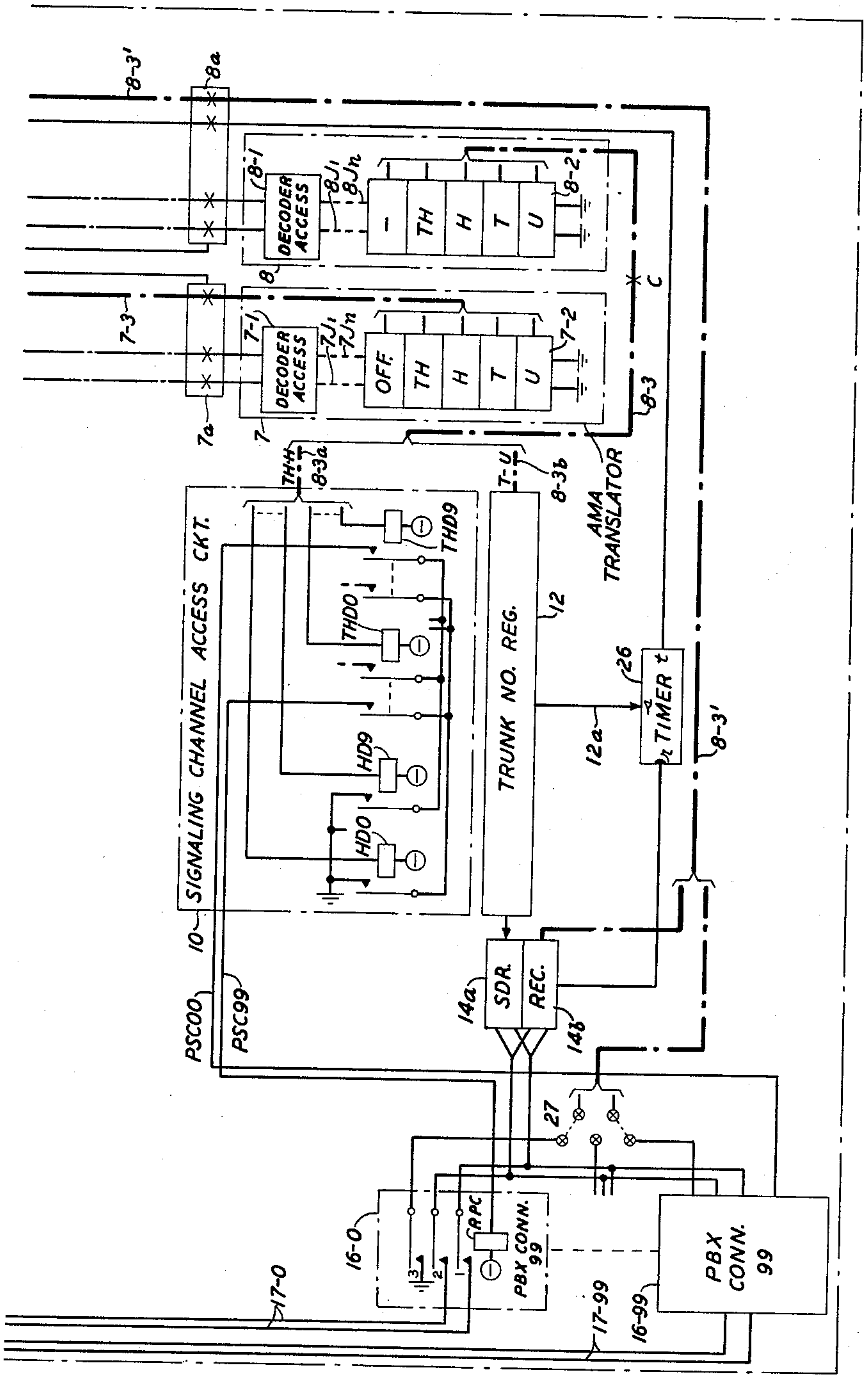
Figure 4:
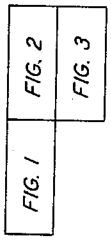

While the extension station directory number identifying apparatus has been described above in connection with the so-called No. 5 crossbar central office in which the party identity is furnished to the transverter via the marker, in the No. 1 crossbar system, on the other hand, party identity is normally passed directly from the subscriber's sender to the transverter. Apparatus similar to that shown in the marker (FIG. 2) for converting ring party to tip party identity when a long haul CID call is being made may be provided in the No. 1 crossbar marker by utilizing the LH and CID relays to extend an operating path to a new message billing index relay (not shown) and to break the path to the normally operated message billing index relay. The message billing index (registered on the message billing index relays not shown), as described in the above-mentioned Cahill patent, is a designation normally determined from the class of service of the calling customer together with the office code of the called customer and constitutes the basis for determining the charging rate on the bulk billed calls where the called is not recorded. At the transverter the operated newly provided message billing index receiving relay will function to effect conversion of the ring party identity to tip party identity. In either event if the extension station directory number is not provided within the timing interval established for timer 26, the ring party identity may be re-established in similar manner to that described for the No. 5 office.

It is to be understood that the above-described arrangements are illustrative of the application of the principles of this invention. Numerous other arrangements may be devised by those skilled in the art without departing from the spirit and scope of the invention.

What is claimed is:

1. An automatic telephone switching system including means for deriving switching routes appropriate to called office codes, means for registering the station identity and service class of a calling line, and translation circuit means normally responsive to predetermined registrations of said switching route, station identity and service class for recording the directory number of said calling line, said telephone system further comprising means for converting at least one of said registrations to cause said translation circuit means to withhold the recording of said directory number of said calling line, means thereafter controlled by said translation circuit in response to said one of said converted registrations for addressing the calling end of said calling line, means for identifying the directory number of an extension station connected to said calling end of said calling line and means including said identifying means for controlling said translation circuit means to record said extension station directory number in lieu of said calling line directory number.

2. An automatic telephone switching system in accordance with claim 1 further comprising means for overriding said means for converting said registrations.

3. An automatic telephone switching system in accordance with claim 1 wherein said means for identifying said extension station directory number comprises an identifying relay associated with said calling line, a plurality of directory number indicating buses and means for cross-connecting said relay with said buses.

4. An automatic telephone switching system in accordance with claim 1 wherein said means for addressing said calling line and said means for controlling said translation circuit includes signaling channel means for transmitting coded information between said translation circuit and said identifying means.

5. In a serially progressive telephone switching system which selectively extends an operating control path from the line sleeves associated with any of a plurality of line sleeve terminal connector banks to the trunk sleeves appearing on any of a plurality of trunk sleeve terminal selector banks, a relay identifying apparatus comprising a plurality of contact-controlling line sleeve terminal relay windings individually connected with said connector bank sleeve terminals, a plurality of decimal number buses, means connecting said buses with the controlled contacts of said relay windings to indicate the directory number of the sleeve terminals individually connected with said windings, and means for applying a relay-operating potential to a trunk sleeve terminal having a said operating control path extended thereto.

6. In a serially progressive telephone switching system according to claim 5 the combination further comprising a contact-controlling connector bank relay having a winding associated with at least one of the controlled contacts of each of the line sleeve terminal relay windings of said connector bank, and means including the controlled contacts of said connector bank relay for activating predetermined ones of said decimal number buses whenever any of said line sleeve terminal relay windings of said connector bank is operated by said relay-operating potential.

7. In a serially-progressive telephone switching system according to claim 5 the combination including means for applying a control path holding potential to said trunk sleeve selector banks and unilateral conduction circuit means for isolating said holding potential from said relay operating potential.

8. An automatic telephone switching system wherein a plurality of telephone call indicia are normally derived for the translation of calling line equipment identity into a calling lined irectory number, means for registering said derived indicia, a plurality of translation means initially accessible to said registering means in accordance with said derived indicia, means coupled to said registering means and responsive to the registration of predetermined indicia therein for entering altered indicia in said translation means, means including said translation means when seized in accordance with said altered indicia for addressing the originating end of a calling line, means at the originating end of said calling line for obtaining the directory number of any extension line connected with said calling line, and timing means at the terminating end of said calling line for canceling said altered and reinstating said normally derived indicia in said translation means.

9. An automatic telephone switching system comprising a central office switch-controlling marker having access to identified groups of calling lines, first and second selection circuit means controlled by said central office marker for registering the group identity of a calling one of said lines, means controlled in accordance with the number called by said calling one of said lines for selectively extending an operating path through one of said first and second selection circuit means, translator means respectively associated with each of said selection circuit means for deriving a calling telephone directory number, a first of said translator means deriving the directory number of said calling line and a second of said translator means deriving a code for addressing the originating end of said calling line, means at said originating end of said line for transmitting a further telephone directory number, and means thereafter controlled by said transmitting means for extending an operating path through the non-selected one of said selection circuit means.

10. An automatic telephone switching systems in accordance with claim 9 wherein said means controlled by said transmitting means comprises means for timing the interval between the operation of said addressing means and the operation of said transmitting means.

11. An automatic switching system in accordance with claim 9 wherein said means at the originating end of said calling line comprises line holding circuit means and means for decoding said derived code to obtain access to said holding circuit means.

12. An automatic telephone switching system comprising a central office having line terminal group identifying frames for incoming lines, marker route translation means associated with said frames for registering dialed office codes, transverter means controlled by said route translation means for registering the line terminal identity of a calling one of said lines in accordance with the dialed code incoming over said calling line, first translator means coupled with said transverter for deriving the directory number of said calling one of said signaling lines, signaling means associated with the originating end of each group of said incoming lines, second translator means coupled with said transverter for addressing said signaling means associated with said calling one of said lines, calling office code digit generating means associated with the terminating end of each said group of incoming lines, means for recording telephone directory numbers, and means controlled by said transverter in accordance with said dialed code for selectively connecting said signaling means, said calling office code digit generating means and said first translator means with said telephone directory number recording means.

13. An automatic telephone system in accordance with claim 12 wherein said signaling means comprises a signaling channel circuit connecting said central office and said originating end of said group of incoming lines.

14. A telephone system including a central switching office and at least one subscriber's branch exchange having a plurality of extension stations connectable through automatically controlled selection switch stages with said central office, a plurality of location-coded trunk lines connecting said central office and a final one of said selection switch stages, means for translating the central office location code of a calling one of said trunk lines in accordance with a called number transmitted by said calling one of said lines, directory number recording means coupled to said translating means, means for obtaining the branch exchange location code of said calling one of said trunk lines, sequence circuit means responsive to predetermined ones of said transmitted numbers for controlling said translating means to activate said branch exchange location code obtaining means, selection circuit means responsive to said last-mentioned means for applying an identifying potential to a final stage terminal of said calling one of said lines, a decimal number bus array, electromagnetic switching means responsive to the appearance of said potential at the extension station side of said selection stages for activating said decimal bus in accordance with the telephone directory number of a calling one of said extension stages, means for transmitting said extension station directory number to said central office, and means for associating said transmitting means with said recording means.

15. A telephone system in accordance with claim 14 further comprising potential responsive impedance means connected to said final stage terminal for maintaining a switching connection through said selection switch stages and means for coupling said identifying potential applying means to said impedance means.

16. A telephone system comprising a branch exchange, a central office having a plurality of lines connected thereto, certain of said lines being trunks extending to said branch exchange, a register for storing called numbers transmitted over said lines, means for distinguishing between numbers transmitted over said trunks and other of said lines and between two classes of calls on said trunks, means for recording identification of the calling line for calls on said other lines and on said trunks for one class of calls, means for preventing operation of said last-mentioned means responsive to the other class of calls on said trunks, means for obtaining from said branch exchange identification of the calling extension for said other class of calls, and means for recording said calling extension identification in lieu of said line identification for said other class of calls on said trunks.

17. A telephone system in accordance with claim 16 wherein said means for obtaining said calling extension identification includes signaling channel means between said branch exchange and said central office, means for seizing said channel means responsive to one of said other class of calls on a trunk, means for transmitting to said branch exchange over said signaling channel means a designation of said trunk, and means for transmitting back to said central office over said signaling channel means said identification of said calling extension.

18. A telephone system in accordance with claim 16 wherein said means for distinguishing between said transmitted numbers includes a marker circuit and relays therein for said two classes of calls on said trunks and said means for recording said identifications includes a transverter circuit, further comrising ring party and tip party connections between said marker and said transverter circuits, means for energizing one of said ring party and tip party connections on calls on said other lines and on said trunks for one class of calls, and means for energizing both said ring party and tip party connections on calls on said other class of calls on said trunks.

19. A telephone system comprising a branch exchange, a central office, a plurality of lines connected to said central office, said lines including a plurality of trunks extending between said branch exchange and said central office, means for normally recording the identification of a calling line at said central office, means for preventing operation of said last-mentioned means on calls of a specified class on said trunks, a data link between said central office and said branch exchange, means for identifying a trunk at said central office on which a call of said specified class appears, means including said data link for transmitting said trunk identification to said branch exchange and for receiving from said branch exchange identification of the calling subscriber for said call of said specified class, and means for recording said calling subscriber identification in lieu of said calling line identification.

20. A telephone system in accordance with claim 19 further comprising means for distinguishing between calls of said specified class for which said calling extension identification is to be recorded and other calls on said trunks for which the calling line identification is to be recorded.

21. A telephone system in accordance with claim 20 further comprising means for causing said recording means to record the line identification of a calling trunk for calls of said specified class if the extension identification is not obtained by said receiving means.

References Cited in the file of this patent

UNITED STATES PATENTS

| | | |
|---|---|---|
| 2,727,092 | Cahill | Dec. 13, 1955 |
| 2,848,543 | Breed et al. | Aug. 19, 1958 |
| 2,903,519 | Grohmann et al. | Sept. 8, 1959 |